May 14, 1968   C. H. CLARRIDGE   3,383,672
SET POINT MODULE SYSTEM FOR ANNUNCIATORS
Filed Feb. 25, 1965   2 Sheets-Sheet 1
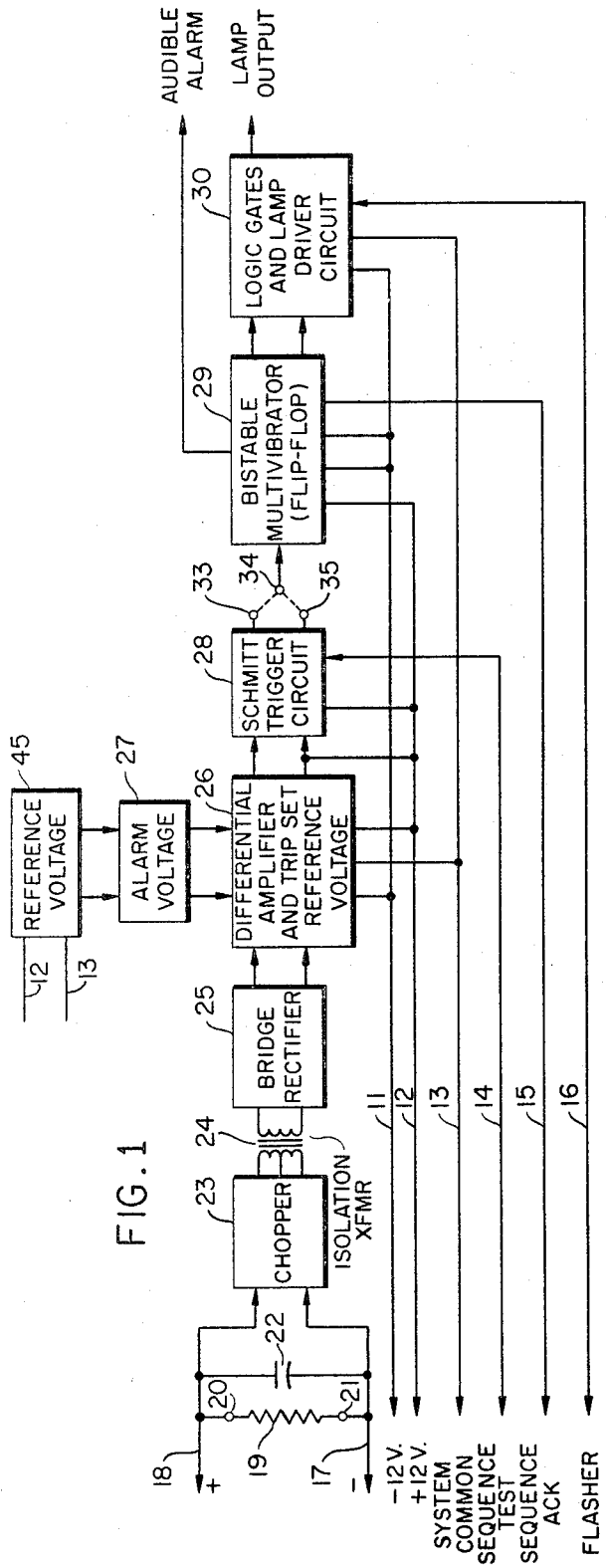
INVENTOR.
CHESTER H. CLARRIDGE
BY
Crumpston + Shaw
ATTORNEYS May 14, 1968 C. H. CLARRIDGE 3,383,672
SET POINT MODULE SYSTEM FOR ANNUNCIATORS
Filed Feb. 25, 1965 2 Sheets-Sheet 2

INVENTOR.
CHESTER H. CLARRIDGE
BY
*Crumpston + Shaw*
ATTORNEYS

United States Patent Office

3,383,672
Patented May 14, 1968

3,383,672
SET POINT MODULE SYSTEM FOR
ANNUNCIATORS
Chester H. Clarridge, Pittsford, N.Y., assignor to Rochester Instrument Systems, Inc., Rochester, N.Y., a corporation of New York
Filed Feb. 25, 1965, Ser. No. 435,236
15 Claims. (Cl. 340—248)

ABSTRACT OF THE DISCLOSURE

An annunciator is formed of set point modules each including a Zener diode for providing a reference voltage, an adjustable potentiometer to select a portion of the reference voltage as an alarm voltage, a resistor for connection to a current-modulated control loop to produce an analogue voltage, a chopper, transformer, and rectifier for producing a test voltage as a function of the analogue voltage and for isolating the module from the control loop, a differential amplifier for comparing the test voltage with the alarm voltage, and logic circuitry actuated by the differential amplifier for producing warning signals as a function of the comparison. Such an arrangement provides DC isolation of annunciator's circuitry from control loop circuitry and allows convenient arrangement of set point circuitry on removable and interchangeable printed circuit module cards in the annunciator housing.

---

This invention relates to annunciators, and more particularly to improved annunciators having removably connected set point modules that reduce spacial requirements for annunciator systems, simplify wiring, and contribute to efficiency and economy.

Annunciators are devices to actuate warning signals including visual signals such as signal lamps and auditory signals such as horns, bells, etc. to alert an operator to variations in monitored conditions. These and other warning signals can be used not only to alert a human operator to deviation in a process, but can be used for recording the time sequence of operations in a process. Annunciator systems are used extensively in process control systems in which process variables such as temperatures, pressures, levels, valve conditions, etc. are sensed by suitable transducers in process control loops, and such transducers transmit signals as to the sensed condition to receivers which send the received data to controllers which adjust the process variable.

Such components comprise a typical control loop, and in the instrumentation and control arts, such control loops are usually current regulated. That is, the current in such control loops is made a function or analogue of the variable that is sensed and the voltage is adjusted to meet the needs of the loop. Such an arrangement is preferred for control loops because the impedence of various instruments and circuits associated with a control loop is preferably variable. Also, it is recognized that electrical isolation of control loops from each other, from annunciator systems, and from instrumentation systems is desirable, and to this end, hard wire connections between such systems and control loops are avoided.

Annunciator systems are typically associated with a plurality of such control loops for actuating warning signals in response to deviation of the process variables from predetermined normal conditions. In performing their alarm and signal functions, annunciators use logic circuitry to follow predetermined sequences such as sounding audible alarms, flashing lights, steady illumination of warning lights, changes of warning conditions upon response or acknowledgement of the operator, automatic reset, etc.

With respect to each control loop with which an annunciator is associated, a set point trip device must be used to trigger the logic circuitry which actuates the annunciator warning signals upon current in the control loop exceeding or falling below a predetermined value. Prior art trip-set devices vary in sophistication from electro-mechanical relays, meter relays, and cam switches in recorders to electronic trip devices. The electronic trips are preferred over devices such as meter relays and cam switches for their improved reliability and accuracy. The electronic trips are connected to the control loop, to a power supply from which they produce a reference signal, and, of course, to the annunciator, and they have separate housings and may be situated remote from the annunciator. They accomplish a trip by operating an electro-mechanical relay to complete an actuation circuit to the annunciator.

Interposition of a relay between electronic trips and the annunciator is necessary to provide the desired electrical isolation between the control loop and the annunciator. It is well-known in the instrumentation and control arts that hard wire connections between instrument and control loops should be eliminated to avoid error signals which can accumulate as a number of instrument or control loops are associated in a single annunciator system. Part of the explanation for this lies in the fact that transducers used in the various control loops are often grounded so that any connection between control loops can possibly complete a circuit through ground to distort the analogue value of current in the loops affected. The possibilities for such error increase with the number of control loops associated in a single annunciator system, so that as a practical matter, no hard wire connection between any annunciator circuits and a control loop is permitted in high-quality annunciator systems.

Previous mechanical trips such as meter relays and recorder cam switches are objectionable for lack of reliability and accuracy, and for their dependence upon the instruments with which they are associated. Their mechanically moving parts are subject to wear, require lubrication for optimum service, and frequently require adjustment and repair. These objections apply even to the mechanically moving part of a relay actuated by an electronic trip, but in addition, electronic trips have been costly, space consuming, and expensive to install and service.

An object of the present invention is to replace previous trip-set devices by an electronic device incorporated into a module unit in the annunciator to effect a saving in space, wiring, installation, and manufacturing cost, while providing simplicity, reliability, and operating and servicing economy.

Another object of the invention is to reduce the cost of annunciator systems while improving their reliability, serviceability, and operating efficiency.

Another object of the invention is to eliminate mechanically moving parts in trip-set devices associated with annunciator systems to effect savings in reliability, accuracy, longevity, and operating efficiency.

Another object of the invention is to incorporate an electronic trip-set device into a printed circuit module card that is conveniently connected with the annunciator chassis by means of separable connector pins and sockets to effect a saving in space, to simplify installation and replacement, and to increase efficiency.

Other objects of the invention will be apparent hereinafter from the specification and from the recital of the appended claims. To these and other ends, the invention resides in certain improvements, all as will be hereinafter more fully described, the novel features being pointed out in the claims at the end of this specification.

In the drawings:

FIG. 1 shows a schematic circuit diagram of a set point annunciator module according to the invention;

FIG. 2 shows a partially schematic side elevation of a module according to the invention.

Figure 3:
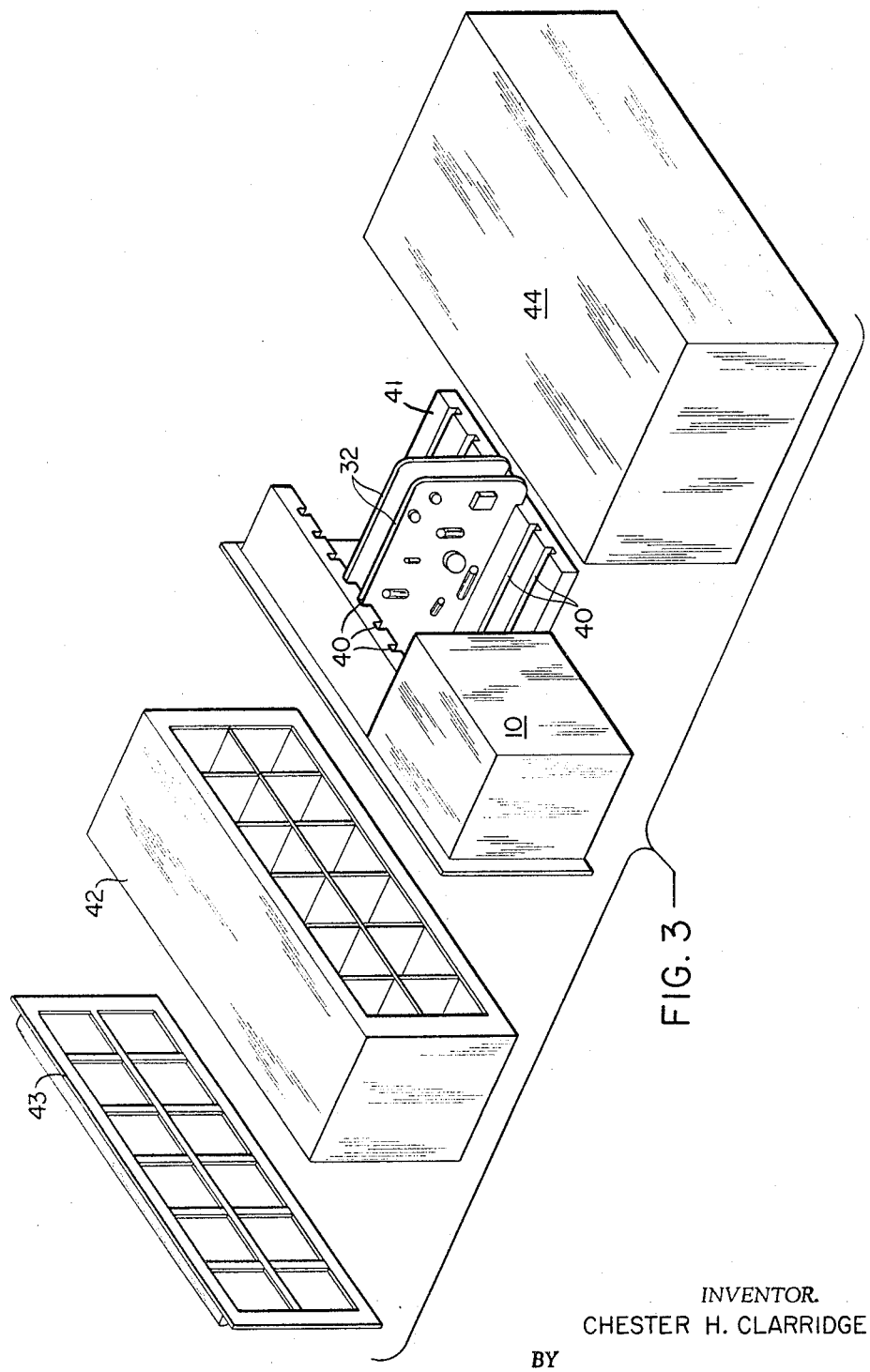
FIG. 3 shows an exploded isometric view of an improved annunciator according to the invention.

Generally, the invention is accomplished by electronic set point devices incorporated into standardized modules preferably in the form of printed circuit cards that are removably connectable to the annunciator chassis and disposed in the annunciator housing for rapid and economical installation and replacement, simplicity and reliability. Each module card also preferably contains the electronic annunciator logic circuitry associated with each trip set and is arranged to provide the desired D-C isolation between annunciator and control loop circuits. Separable connector pins and sockets are preferred for connecting such module units to an annunciator chassis, and the chassis is preferably powered by a single annunciator power supply.

The circuit diagram of FIG. 1 schematically illustrates a preferred embodiment of a set point annunciator according to the invention. Such a module is preferably connected with the chassis of an annunciator having a power supply 10 (schematically illustrated in FIG. 3) from which various necessary power and signals are provided in lines 11–16.

Lines 17 and 18 represent a current-regulated control loop to which the illustrated set point module is connected. Such connection is accomplished by resistor 19 joining terminals 20 and 21 across the control loop to provide an analogue voltage proportional to the current in the control loop. Filter capacitor 22 is connected in parallel with resistor 19.

The D-C analogue voltage from resistor 19 is applied to chopper 23 which is preferably solid state and which converts the D-C analogue voltage to an A-C square wave voltage of approximately the same magnitude. The A-C voltage from chopper 23 is used on the primary of isolation transformer 24, and the output of transformer 24 is used to drive a preferably full wave bridge rectifier 25 to provide a D-C test voltage proportional to the analogue voltage.

The interposition of transformer 24 between the analogue voltage derived from the control loop and the test voltage produced by the bridge rectifier is preferred to eliminate any hard wire connection between the annunciator circuitry and the control loop, and to provide the D-C isolation necessary for optimum functioning in instrument and control loop circuits.

From lines 12 and 13 at the top of FIG. 1, reference voltage generator 45, which preferably includes a Zener diode, generates a reference voltage of predetermined value, and a preselected portion of this reference voltage is selected by alarm voltage generator 27 which preferably includes an adjustable potentiometer. The alarm voltage from potentiometer or other device 27 is applied to differential amplifier 26 along with the test voltage output of rectifier 25. Differential amplifier 26, which is powered through lines 11–13, is preferably adapted for high-gain amplification of any test voltage in excess of the alarm voltage so as to supply a signal to Schmitt trigger 28 whenever the test voltage exceeds the alarm voltage and not to provide any signal to Schmitt trigger 28, whenever the test voltage is less than the alarm voltage. Thus, differential amplifier 26 compares or correlates the test and alarm voltages to provide an output signal as a function of such correlation.

Alternatively the alarm voltage applied to differential amplifier 26 can comprise a voltage signal from a different control loop, such voltage signal preferably being isolated from its control loop by an isolation transformer. In such case, differential amplifier 26 would effectively compare or correlate test voltages from two different control loops rather than comparing a test voltage from one loop with a preselected alarm voltage. Of course, any such voltages for comparison from two different control loops can be proportionally adjusted by well-known means so that the annunciator can be actuated for a predetermined deviation between the two compared voltages.

The Zener diode reference voltage generator 45 is preferably standardized to produce a given reference voltage for each module, and lines 12 and 13 are preferably connected to a plurality of such modules so that by adjustment of alarm voltage device or potentiometer 27, a variety of predetermined alarm voltages are available to each respective module, and by suitable adjustment of potentiometer 27, modules according to the invention can be interchanged.

Terminals 33 and 35 of Schmitt trigger 28 are preferably alternatively connected with terminal 34 in circuit with logic circuit devices such as bi-stable multivibrator or flip-flop 29 and logic gates 30. Such alternative connection of terminals 33 and 35 with terminal 34 selectively adapts the module for high-trip or low-trip, Schmitt trigger 28 being adapted by such selective connection for alternatively applying a signal to flip-flop 29 upon receipt of a signal from differential amplifier 26 or upon lack of a signal from differential amplifier 26.

Schmitt trigger 28, flip-flop 29, and logic gates 30 cooperate to develop appropriate signals required by the annunciator for actuating warning signals such as lamps or horns, bells, etc., in the desired alarm sequence.

A preferred embodiment of the set point annunciator module shown in the circuit diagram of FIG. 1 is partially schematically illustrated in FIG. 2 as module 32 which is preferably formed on printed circuit card 31. The components illustrated in FIG. 1 are incorporated into and placed on printed circuit card 31 in a well-known manner, and such components are not illustrated in FIG. 2 because their shape, location, and connection to card 31 can be in any of a variety of well-known ways and is not a part of the invention.

Terminals 20 and 21 across which resistor 19 is connected are illustrated in FIG. 2, and provide the necessary connection to control loop lines 17 and 18. For applications where it is preferred not to bring control loop lines 17 and 18 into the annunciator, resistor 19 can be connected across the control loop at a point remote from module 32, and the analogue voltage thus derived, can be applied to the module by proper connection to terminals 20 and 21.

Terminals 33–35 illustrated in FIG. 2 are jumper terminals for the above-described alternative connection of Schmitt trigger 28 to flip-flop 29 to adjustably adapt module 32 for high-trip or low-trip. Terminals 36 and 37 are preferably provided for varying the annunciator system sequence as to reset, jumpering terminals 36 and 37 providing automatic reset, and omission of a jumper between these terminals providing lock-in.

One of the advantages of module 32 according to the invention is the simplicity of its connection to the annunciator. Terminal or pin connectors 38 from module 32 engage corresponding sockets 39 in annunciator chassis 41 so that module 32 is connected and removed from the annunciator merely by sliding pins 38 into sockets 39 or withdrawing pins 38 from sockets 39. Of course, the sockets and pins can be reversed in whole or in part relative to module 32 and annunciator chassis 41, so that pins can be provided on chassis 41 and sockets on module 32 with the same facility as the illustrated arrangement.

Preferably, a plurality of standardized modules such as modules 32 are removably connected to the chassis 41 of an annunciator as illustrated in the exploded view of FIG. 3. Standardized modules can be easily replaced and interchanged with one another, the only adjustment necessary being the proper jumpering of terminals 33–37 and the proper setting of set point adjustment 27. Modules 32 are preferably slidable in slots 40 formed in the chassis 41, and as so disposed, modules 32 can be connected to the annunciator by being slid forward in their respective slots 40 and can be removed by withdrawing them rearwardly from slots 40.

The annunciator's well-known power supply circuitry is schematically represented by box 10 in FIG. 3, and power supply 10 along with chassis 41 is connected to lamp box 42, the front portion of which contains signal lamps viewable through translucent windows 43. The annunciator assembly is enclosed in a protective housing cover 44, and as so enclosed, modules 32 are compactly disposed within the annunciator housing 44 along with other annunicator components for a saving in space.

From the foregoing, it can be seen thot the improved annunciator system with standardized, replaceable, and interchangeable modules 32 effects a considerable saving in wiring and installation from previous separate trip-set devices which had to be connected to control loops, their own power supplies, and the annunciator circuits. Modules 32 according to the invention are quickly and easily installed, replaced, and serviced, are conveniently formed on printed circuit cards 31 and compactly disposed within the annunciator housing.

While the invention has been disclosed herein by reference to the details of a preferred embodiment, it is to be understood that such disclosure is intended in an illustrative, rather than a limiting, sense, and it is contemplated that various modifications of the construction and arrangement of the parts will readily occur to those skilled in the art, within the spirit of the invention and the scope of the appended claims.

I claim:

1. In an annunciator responsive to a plurality of process control loops, a corresponding plurality of set point trip means connectable respectively to each of said control loops, each of said trip means comprising:
   (a) means for providing a preselected, invariable comparison signal;
   (b) means for providing an analogue signal related to variable conditions in said respective control loop;
   (c) means including an isolation transformer for producing a test signal as a function of said analogue signal;
   (d) means for correlating said test signal with said comparison signal; and
   (e) means for actuating said annunciator as a function of said correlation.

2. The annunciator of claim 1 wherein said annunciator includes means for providing a reference signal and means for deriving said comparison signal from said reference signal.

3. The annunciator of claim 1 wherein said comparison signal is an analogue of current in another one of said control loops.

4. The annunciator of claim 1 wherein said means for producing said test signal includes a chopper and a rectifier.

5. The annunciator of claim 1 wherein said correlation means includes a differential amplifier.

6. The annunciator of claim 1 wherein said comparison signal means includes a potentiometer for adjusting said invariable comparison signal.

7. In an annunciator adapted to actuate warning signal means as a function of current variation in current-regulated process control loops, the improvement comprising a set point annunciator module removably connectable to said annunciator and physically disposed within said annunciator, said module comprising:
   (a) means for providing a reference voltage;
   (b) means for connecting said module to one of said control loops to produce an analogue voltage of current in said one control loop;
   (c) means including a chopper, a transformer, and a rectifier for producing a test voltage as a function of said analogue voltage;
   (d) said transformer being disposed in the only electrical path between said module and said control loop;
   (e) adjustable means for selecting a predetermined proportion of said reference voltage as an alarm voltage;
   (f) differential amplifier means for comparing said test voltage and said alarm voltage; and
   (g) logic circuitry for actuating said warning signal means as a function of said comparison.

8. The annunciator of claim 7 wherein said reference voltage comprises an analogue voltage of current in another one of said control loops, and said reference voltage is isolated from said other one of said control loops by an isolation transformer.

9. The annunciator of claim 7 wherein said module is formed as a unit on a printed circuit card adapted to be plugged into a chassis of said annunciator by means of separable connector pins and sockets.

10. The annunciator of claim 9 wherein a plurality of said modules are each connected to different respective ones of said control loops and removably connected to said annunciator, and each adjustable means comprises a potentiometer disposed on each respective module, each of said potentiometers being independently adjustable to provide various respective alarm voltages for said modules.

11. The annunciator of claim 10 wherein each of said modules is adjustable for actuating said warning signal means alternatively in response to said test voltage exceeding a predetermined value or in response to said test voltage falling below a predetermined value.

12. In an annunciator system, the combination comprising:
   (a) a housing;
   (b) a chassis disposed in said housing;
   (c) a power supply disposed in said housing and connected to said chassis;
   (d) a plurality of process control loops;
   (e) warning signal means disposed in said housing and adapted to be actuated in predetermined sequences in response to respective variations of current in said process control loops; and
   (f) a plurality of set point modules, each formed on a printed circuit card and removably connectable to said chassis by means of separable connector pins and sockets, each of said set point modules comprising:
      (1) a resistor and filter capacitor in parallel connected across one of said process control loops to produce an analogue voltage;
      (2) a chopper in circuit with said resistor and to which said analogue voltage is applied;
      (3) an isolation transformer in circuit with said chopper and to the primary of which the output of said chopper is applied;
      (4) a rectifier connected to said transformer for rectifying the output of said transformer to provide a test voltage proportional to said analogue voltage;
      (5) means for producing a comparison voltage;
      (6) a differential amplifier in circuit with said rectifier and said means for producing a comparison voltage, said differential amplifier being adapted for correlating said comparison voltage and said test voltage to produce an output as a function of said correlation; and
      (7) logic circuitry for actuating said warning signal means in response to said output from said differential amplifier.

13. The annunciator system of claim 12 wherein said comparison voltage is an analogue of current in another one of said process control loops.

14. The annunciator system of claim 12 wherein said means for producing said comparison voltage comprises a Zener diode for producing a predetermined reference voltage, and a potentiometer for preselecting a portion of said reference voltage as said comparison voltage.

15. In an annunciator system, the combination comprising:
   (a) a housing;
   (b) a chassis disposed in said housing;
   (c) a power supply disposed in said housing and connected to said chassis;
   (d) a plurality of process control loops;
   (e) warning signal means including signal lamps disposed in said housing and an audible alarm, said warning signal means being adapted to be actuated in predetermined sequences in response to variation of current in said respective process control loops;
   (f) a plurality of set point annunciator modules, each formed on a printed circuit card and removably connectable to said chassis by means of separate connector pins and sockets, each of said set point annunciator modules comprising:
      (1) a resistor and filter capacitor in parallel connected across one of said process control loops to produce a voltage analogue of current in said one loop;
      (2) a solid-state chopper in circuit with said resistor and to which said analogue voltage is applied, said chopper being adapted to produce a square wave output;
      (3) an isolation transformer in circuit with said chopper and to the primary of which said output of said chopper is applied;
      (4) a bridge rectifier in circuit with said transformer for rectifying the output of said transformer to form a test voltage proportional to said analogue voltage;
      (5) means including a Zener diode for producing a reference voltage of predetermined value;
      (6) an adjustable potentiometer in circuit with said Zener diode for selecting a predetermined proportion of said reference voltage as an alarm voltage;
      (7) a differential amplifier in circuit with said potentiometer and said rectifier and to which said test voltage and said alarm voltage are each applied, said differential amplifier being adapted for correlating said test voltage with said alarm voltage to produce an output as a function of said correlation;
      (8) a Schmitt trigger in circuit with said differential amplifier and to which said output of said differential amplifier is applied, said Schmitt trigger being adapted for producing an actuating signal as a function of said output of said differential amplifier; and
      (9) logic circuitry in circuit with said Schmitt trigger for receiving said actuating signal therefrom and including a bi-stable multivibrator and logic gates for actuating said warning signal means in a respective one of said predetermined sequences in response to a predetermined variation of current in said one process control loop.

References Cited

UNITED STATES PATENTS

| | | | |
|---|---|---|---|
| 2,692,962 | 10/1954 | Thomson | 317—130 |
| 2,774,056 | 12/1956 | Stafford et al. | 340—149 |
| 3,147,402 | 9/1964 | Hochstetler | 317—101 XR |
| 3,169,214 | 2/1965 | Whitehorn | 317—101 XR |

JOHN W. CALDWELL, *Primary Examiner.*

THOMAS B. HABECKER, *Examiner.*

D. K. MYER, *Assistant Examiner.*